(12) United States Patent
Sakaguchi et al.

(10) Patent No.: US 11,197,405 B2
(45) Date of Patent: Dec. 14, 2021

(54) HARVESTING MACHINE AND TRAVEL MODE SWITCHING METHOD

(71) Applicant: Kubota Corporation, Osaka (JP)

(72) Inventors: Kazuo Sakaguchi, Amagasaki (JP);
Tomohiko Sano, Amagasaki (JP);
Osamu Yoshida, Amagasaki (JP);
Takashi Nakabayashi, Sakai (JP);
Sotaro Hayashi, Sakai (JP); Masayuki Horiuchi, Sakai (JP); Mitsuhiro Seki, Sakai (JP); Kyosuke Yamaoka, Sakai (JP); Satoshi Maruo, Amagasaki (JP)

(73) Assignee: Kubota Corporation, Osaka (JP)

( * ) Notice: Subject to any disclaimer, the term of this patent is extended or adjusted under 35 U.S.C. 154(b) by 29 days.

(21) Appl. No.: 16/765,913

(22) PCT Filed: Nov. 16, 2018

(86) PCT No.: PCT/JP2018/042393
§ 371 (c)(1),
(2) Date: May 21, 2020

(87) PCT Pub. No.: WO2019/111669
PCT Pub. Date: Jun. 13, 2019

(65) Prior Publication Data
US 2020/0359547 A1    Nov. 19, 2020

(30) Foreign Application Priority Data

Dec. 7, 2017  (JP) .............................. JP2017-235452
Dec. 7, 2017  (JP) .............................. JP2017-235453

(51) Int. Cl.
*A01B 69/00*      (2006.01)
*B60W 60/00*      (2020.01)
(Continued)

(52) U.S. Cl.
CPC ........... *A01B 69/00* (2013.01); *B60W 50/082* (2013.01); *B60W 60/005* (2020.02);
(Continued)

(58) Field of Classification Search
CPC ...................................................... A01B 69/00
See application file for complete search history.

(56) References Cited

U.S. PATENT DOCUMENTS 5,448,479 A  *  9/1995  Kemner ................... B62D 1/28
                                                           180/167
5,469,356 A  *  11/1995  Hawkins .............. G05D 1/0038
                                                            701/48

(Continued)

FOREIGN PATENT DOCUMENTS

EP          3270253  A1    1/2018
JP       2014170481  A     9/2014
(Continued)

*Primary Examiner* — Shelley Chen
(74) *Attorney, Agent, or Firm* — The Webb Law Firm

(57) ABSTRACT

The present disclosure includes a travel operation unit that is configured to be manually operated and includes a mode operation tool for switching between automatic driving and manual driving, a manual travel control unit that includes a manual travel mode in which manual driving is performed based an operation signal received from the travel operation unit, and an automatic travel control unit that includes an automatic travel mode in which automatic driving is performed, a temporary stop mode in which a vehicle body is temporarily stopped during automatic driving for transitioning from the automatic travel mode to the manual travel mode, and a check mode in which whether a state of the travel operation unit satisfies a manual driving transition condition required for starting manual driving is checked in transition from the temporary stop mode to the manual travel mode.

4 Claims, 7 Drawing Sheets

(51) Int. Cl.
  *B60W 50/08* (2020.01)
  *G05D 1/00* (2006.01)
  *B60W 50/00* (2006.01)

(52) U.S. Cl.
  CPC ..... *G05D 1/0061* (2013.01); *B60W 2050/007* (2013.01); *G05D 2201/0201* (2013.01)

(56) References Cited

U.S. PATENT DOCUMENTS

2016/0340867 A1* 11/2016 Matsuzaki ........... A01B 69/008
2017/0217311 A1* 8/2017 Puchowicz ........... F02D 11/107
2017/0313316 A1* 11/2017 Shiraishi ................ B60W 10/11
2018/0362045 A1* 12/2018 Zagorski ........... B60W 30/1884

FOREIGN PATENT DOCUMENTS

| JP | 2014180894 A | | 9/2014 |
|----|--------------|---|--------|
| JP | 2016168883 A | * | 9/2016 |
| JP | 2016168883 A | | 9/2016 |

* cited by examiner

Fig.1
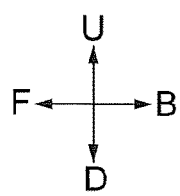
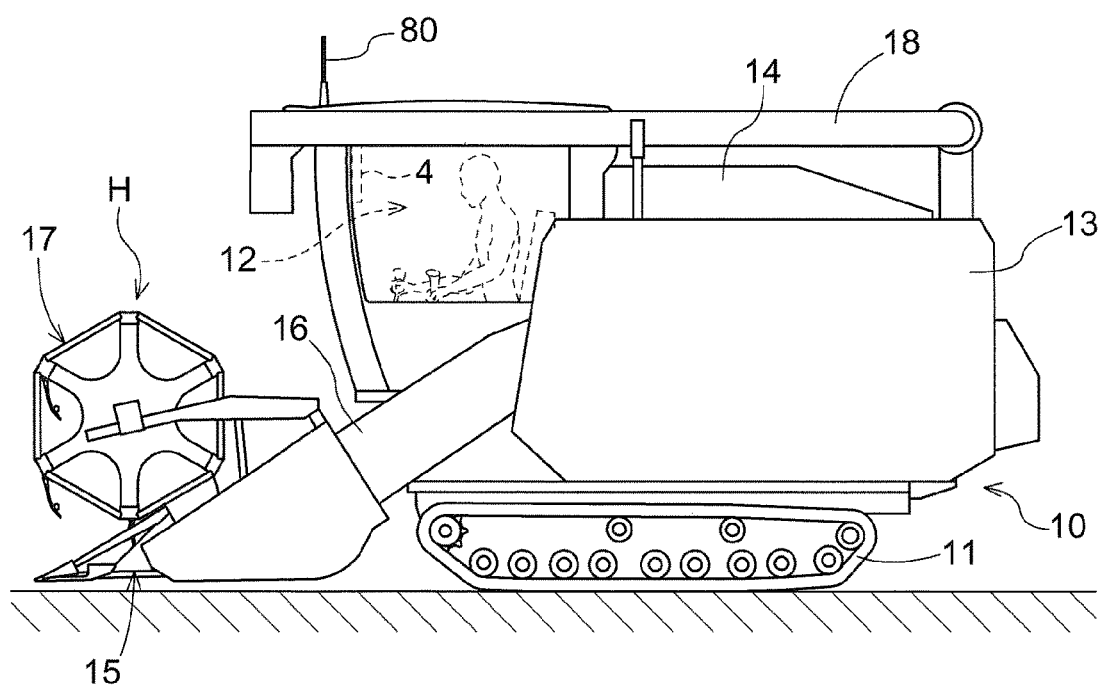

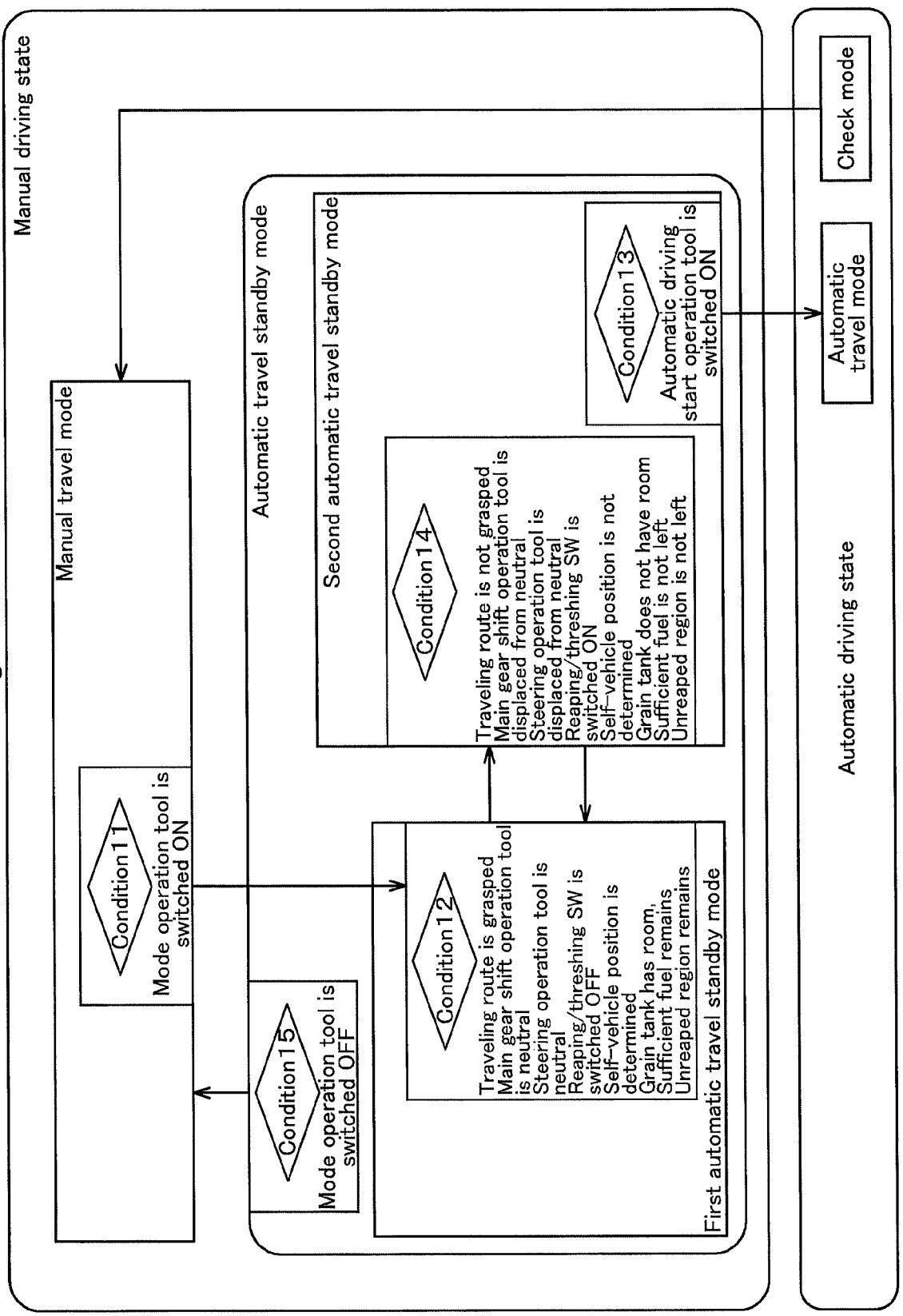

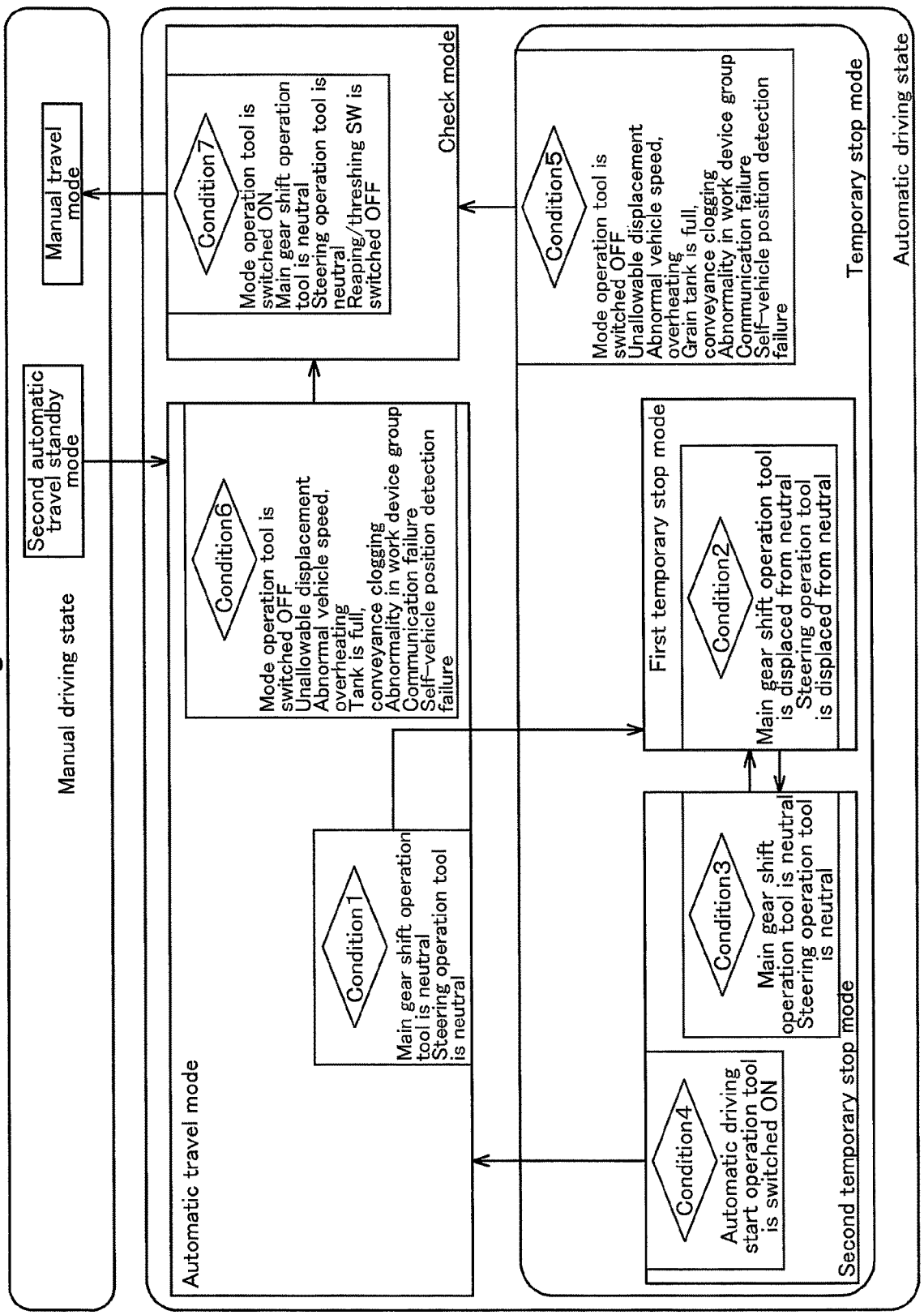

HARVESTING MACHINE AND TRAVEL MODE SWITCHING METHOD

CROSS-REFERENCE TO RELATED APPLICATIONS

This application is the United States national phase of International Application No. PCT/JP2018/042393 filed Nov. 16, 2018, and claims priority to Japanese Patent Application Nos. 2017-235452 and 2017-235453, filed Dec. 7, 2017, the disclosures of which are hereby incorporated by reference in their entirety.

TECHNICAL FIELD

The present invention relates to a harvesting machine that enables automatic driving and manual driving, and to a travel mode switching method.

BACKGROUND ART

Patent Document 1 discloses a travel vehicle that includes an automatic travel mode in which the vehicle is caused to automatically travel along a set route, a manual travel mode in which the vehicle is caused to travel according to operations made by a person, a manual travel preparation mode that is a transition mode for transitioning from the automatic travel mode to the manual travel mode, and an automatic travel preparation mode that is a transition mode for transitioning from the manual travel mode to the automatic travel mode. In the automatic travel preparation mode, the engine is set to an idling speed and the vehicle ceases traveling and waits until an automatic travel operation start instruction is issued. In the manual travel preparation mode, the engine is set to the idling speed and the vehicle ceases traveling and waits until a manual travel operation start instruction is issued.

Patent Document 2 discloses a work vehicle that includes an automatic travel control unit that executes automatic traveling based on a self-vehicle position and a target traveling route, a manual travel control unit that executes manual traveling based on operation signals received from a manually operated travel operation unit, a first control unit that executes transition from manual traveling to automatic traveling under a condition that the vehicle is manually stopped, and a second control unit that forcibly stops the vehicle in transition from automatic traveling to manual traveling. According to this configuration, in transition from manual traveling to automatic traveling, the vehicle is stopped through an operation made by a passenger, and in transition from automatic traveling to manual traveling, the vehicle is automatically forcibly stopped, and accordingly unexpected movement of the vehicle is suppressed in transition from automatic traveling to manual traveling or from manual traveling to automatic traveling.

PRIOR ART DOCUMENTS

Patent Documents

Patent Document 1: JP 2014-180894A
Patent Document 2: JP 2016-168883A

DISCLOSURE OF THE INVENTION

Problem to be Solved by the Invention

In the work vehicles capable of performing automatic traveling and manual traveling disclosed in Patent Documents 1 and 2, only one transition mode is set in a process for transitioning from manual traveling to automatic traveling or from automatic traveling to manual traveling. In the case of a harvesting machine in which various work devices constituting a harvest work apparatus need to be controlled, conditions for transitioning from an automatic travel mode to a manual travel mode and conditions for transitioning from the manual travel mode to the automatic travel mode are complex, and therefore it is difficult to perform transition with one transition mode that is adapted to the various working devices unique to the harvesting machine.

Under these circumstances, there are demands for a harvesting machine that can stepwisely transition from an automatic travel mode in which automatic driving is performed to a manual travel mode in which manual driving is performed, by using transition modes that have a plurality of divided transition conditions.

Similarly, there are demands for a harvesting machine that can stepwisely transition from a manual travel mode in which manual driving is performed to an automatic travel mode in which automatic driving is performed, by using transition modes that have a plurality of divided transition conditions.

Means for Solving Problem

A harvesting machine according to one embodiment of the present invention includes a harvest work apparatus and enables automatic driving and manual driving, the harvesting machine including a travel operation unit that is configured to be manually operated and includes a mode operation tool for switching between the automatic driving and the manual driving and a manual travel control unit that includes a manual travel mode in which the manual driving is performed based on an operation signal received from the travel operation unit, the harvesting machine further including an automatic travel control unit that includes an automatic travel mode in which the automatic driving is performed based on a self-vehicle position and a target traveling route, a temporary stop mode in which a vehicle body is temporarily stopped during the automatic driving for transitioning from the automatic travel mode to the manual travel mode, and a check mode in which whether a state of the travel operation unit satisfies a manual driving transition condition required for starting the manual driving is checked in transition from the temporary stop mode to the manual travel mode.

A travel mode switching method according to one embodiment of the present invention is a method for switching a travel mode of a harvesting machine that includes a harvest work apparatus and can be switched between an automatic travel mode in which automatic driving is performed and a manual travel mode in which manual driving is performed, wherein switching from the automatic travel mode to the manual travel mode includes, upon a first transition condition being satisfied, transitioning from the automatic travel mode to a temporary stop mode in which a vehicle body is temporarily stopped during the automatic driving, upon a second transition condition required for starting the manual driving being satisfied, transitioning from the temporary stop mode to a check mode, and upon a manual driving transition condition being satisfied, transitioning from the check mode to the manual travel mode.

In these configurations, two transition modes in which the vehicle body is temporarily stopped, i.e., the temporary stop mode and the check mode, are provided as modes via which transition from the automatic travel mode, in which automatic driving is executed in a field, to the manual travel mode, in which manual driving is executed, is performed. The temporary stop mode is a preparation mode for transitioning from automatic driving to manual driving, and the check mode is the final mode in transition from a temporary stop state to manual driving. With these configurations, automatic driving can be appropriately switched to manual driving while various functions of the harvesting machine are set using a procedure that is divided into well-ordered steps.

A major difference between automatic driving and manual driving is in that adjustment of the steering and the vehicle speed is changed from adjustment performed under automatic control to adjustment performed through manual operations. For example, if automatic driving is switched to manual driving when a gear shift state is not neutral and a steering state is not neutral (a turning state), the driver in charge of manual driving may be bewildered because the vehicle body is turning while traveling. Furthermore, if the harvest work apparatus is also being driven, harvesting work may not be appropriately performed when manual traveling is started. On the contrary, if the gear shift state and the steering state are neutral and the harvest work apparatus is stopped, the driver who performs manual driving can calmly start work traveling. For this reason, in a preferred embodiment of the present invention, the travel operation unit includes a main gear shift operation tool and a steering operation tool, and the manual driving transition condition is that an automatic driving stop request is output from the mode operation tool, the main gear shift operation tool is set to a neutral position, the steering operation tool is set to a neutral position, and driving of the harvest work apparatus is stopped.

In order to actually start manual driving from the temporary stop mode, which is a transition mode for preparing for transitioning from the automatic travel mode to the manual travel mode, the travel mode further transitions to the check mode. As described above, the travel mode transitions from the automatic travel mode via the temporary stop mode and the check mode to the manual travel mode, and accordingly various conditions can be allocated to the respective modes. Switching from automatic driving to manual driving is switching from a role as an observer to a role as a driver, and therefore the intention of the observer is important as a condition for this transition. For this reason, in a preferred embodiment of the present invention, the travel operation unit includes a main gear shift operation tool and a steering operation tool, and a condition (first transition condition) for transitioning from the automatic travel mode to the temporary stop mode is that the main gear shift operation tool is set to a neutral position and the steering operation tool is set to a neutral position.

The check mode is the final mode before the harvesting machine is switched to manual driving, and accordingly, it is preferable to immediately transition from the automatic travel mode to the check mode upon the occurrence of a behavior that indicates an emergency in which automatic driving cannot be continued. However, in a normal state other than emergencies, it is preferable to check the state of an operation tool operated by the driver to confirm intention of the driver, as a condition for transitioning to the check mode. For this reason, in a preferred embodiment of the present invention, a condition (second transition condition) for transitioning from the temporary stop mode to the check mode includes at least one of output of an automatic driving stop request from the mode operation tool, an abnormal vehicle speed, inappropriate positioning, deviation of the self-vehicle position, and a trouble (abnormality) in the harvest work apparatus.

In a preferred embodiment of the present invention, the temporary stop mode includes a first temporary stop mode and a second temporary stop mode for which transition between each other is allowed, transition from the automatic travel mode to the temporary stop mode is transition to the first temporary stop mode, and transition from the temporary stop mode to the automatic travel mode is transition from the second temporary stop mode. In this configuration, the temporary stop mode is further divided into the first temporary stop mode and the second temporary stop mode, and therefore automatic driving is switched to manual driving while various functions of the harvesting machine are set using a procedure that is divided into well-ordered steps. Similarly, the travel mode returns from the temporary stop mode to the automatic travel mode following a procedure that is divided into well-ordered steps. That is, with this configuration, devices are appropriately controlled even during transition between automatic driving and manual driving.

In the above-described configuration of the temporary stop mode, transition from the automatic travel mode to the temporary stop mode is performed via the first temporary stop mode, and transition from the temporary stop mode to the automatic travel mode is performed via the second temporary stop mode. In a specific example of conditions for transitioning between the first temporary stop mode and the second temporary stop mode, the travel operation unit includes a main gear shift operation tool and a steering operation tool, and a condition (third transition condition) for transitioning from the first temporary stop mode to the second temporary stop mode is that the main gear shift operation tool is displaced from a neutral position and the steering operation tool is displaced from a neutral position, and a condition (fourth transition condition) for transitioning from the second temporary stop mode to the first temporary stop mode is that the main gear shift operation tool is set to the neutral position and the steering operation tool is set to the neutral position. With this configuration, unexpected movement of the harvesting machine can be suppressed when automatic driving is switched to manual driving.

A harvesting machine according to one embodiment of the present invention is a harvesting machine that enables automatic driving and manual driving and includes a travel operation unit that is configured to be manually operated and includes a mode operation tool for switching between the automatic driving and the manual driving and an automatic driving start operation tool, an automatic travel control unit that includes an automatic travel mode in which the automatic driving is performed based on a self-vehicle position and a target traveling route, and a manual travel control unit that includes a manual travel mode in which the manual driving is performed based on an operation signal received from the travel operation unit and an automatic travel standby mode for transitioning from the manual travel mode to the automatic travel mode, wherein the automatic travel standby mode includes a first automatic travel standby mode and a second automatic travel standby mode for which transition between each other is allowed, transition from the manual travel mode to the automatic travel standby mode is transition to the first automatic travel standby mode, transition from the automatic travel standby mode to the automatic travel mode is transition from the second automatic travel standby mode, a condition for transitioning from the manual travel mode to the first automatic travel standby mode includes a mode switch request for switching to the automatic driving, which is output from the mode operation tool, and a condition for transitioning from the second automatic travel standby mode to the automatic travel mode includes an automatic driving start request, which is output from the automatic driving start operation tool.

A travel mode switching method according to one embodiment of the present invention is a method for switching a travel mode of a harvesting machine that can be switched between an automatic travel mode in which automatic driving is performed and a manual travel mode in which manual driving is performed, wherein the manual travel mode is switched to the automatic travel mode via an automatic travel standby mode that includes a first automatic travel standby mode and a second automatic travel standby mode, the travel mode switching method includes, upon a fifth transition condition being satisfied, transitioning from the manual travel mode to the first automatic travel standby mode, upon a sixth transition condition being satisfied, transitioning from the first automatic travel standby mode to the second automatic travel standby mode, and upon a seventh transition condition being satisfied, transitioning from the second automatic travel standby mode to the automatic travel mode, the fifth transition condition includes a mode switch request for switching to the automatic driving, and the seventh transition condition includes an automatic driving start request.

According to these configurations, transitioning from the manual travel mode to the automatic travel mode is performed via the automatic travel standby mode that has a role of making the harvesting machine be on standby for the start of automatic traveling. Furthermore, the automatic travel standby mode includes the first automatic travel standby mode and the second automatic travel standby mode for which transition between each other is allowed, and transition to the automatic travel mode is realized only after the travel mode initially transitions from the manual travel mode to the first automatic travel standby mode and then transitions from the first automatic travel standby mode to the second automatic travel standby mode. That is, transition from the manual travel mode to the automatic travel mode requires two steps of mode transition. With this configuration, manual driving is appropriately switched to automatic driving while various functions of the harvesting machine are set using a procedure that is divided into well-ordered steps. At this time, the mode operation tool needs to be operated to cause transition from the manual travel mode to the first automatic travel standby mode, and the automatic driving start operation tool needs to be operated to cause transition from the second automatic travel standby mode to the automatic travel mode. Since manual operations need to be performed in two steps to cause transition from the manual travel mode to the automatic travel mode, automatic traveling is more reliably and appropriately started.

In a preferred embodiment of the present invention, the automatic driving start operation tool includes a plurality of operation tools, and the automatic driving start request is output through operations made to the plurality of operation tools. In this configuration, output of the automatic driving start request is the final requirement for starting automatic traveling, and the plurality of operation tools constituting the automatic driving start operation tool need to be operated to output this automatic driving start request. This configuration suppresses a situation in which automatic traveling is unexpectedly started through an unconscious operation.

In a preferred embodiment of the present invention, the travel operation unit includes a main gear shift operation tool and a steering operation tool, a condition (sixth transition condition) for transitioning from the first automatic travel standby mode to the second automatic travel standby mode is that automatic driving preliminary conditions are satisfied, the automatic driving preliminary conditions including conditions that the target traveling route is set, the main gear shift operation tool is set to a neutral position, the steering operation tool is set to a neutral position, and the self-vehicle position is determined, and transition from the second automatic travel standby mode to the first automatic travel standby mode is performed if at least one of condition elements included in the automatic driving preliminary conditions is not satisfied in the second automatic travel standby mode. In this configuration, preliminary conditions for starting automatic driving are that the harvesting machine is stopped in a state of not being steered and the target traveling route required for automatic traveling is set, i.e., the state of devices of the harvesting machine is adapted to automatic traveling, and these conditions are conditions for transitioning from the first automatic travel standby mode to the second automatic travel standby mode. Accordingly, the intention to cause mode transition is reflected to some extent in a preparation step, and an unexpected mode change can be prevented. If these transition conditions are satisfied, the devices of the harvesting machine are in a state for performing automatic traveling, and therefore the travel mode transitions to the second automatic travel standby mode to wait for a determination to be made by a passenger. As a result of mode transition being performed in the two steps described above, automatic traveling can be more reliably and appropriately started. Furthermore, if at least one of the condition elements included in the automatic driving preliminary conditions is not satisfied in the second automatic travel standby mode, the travel mode immediately returns to the first automatic travel standby mode, and therefore unprepared start of automatic traveling is avoided.

BRIEF DESCRIPTION OF THE DRAWINGS

FIG. 1 is a side view of a regular combine harvester as one example of a harvesting machine.

FIG. 6 is a schematic diagram showing transition conditions for mode transition from manual driving to automatic driving.

FIG. 7 is a schematic diagram showing transition conditions for mode transition from automatic driving to manual driving.

BEST MODE FOR CARRYING OUT THE INVENTION

Figure 2:
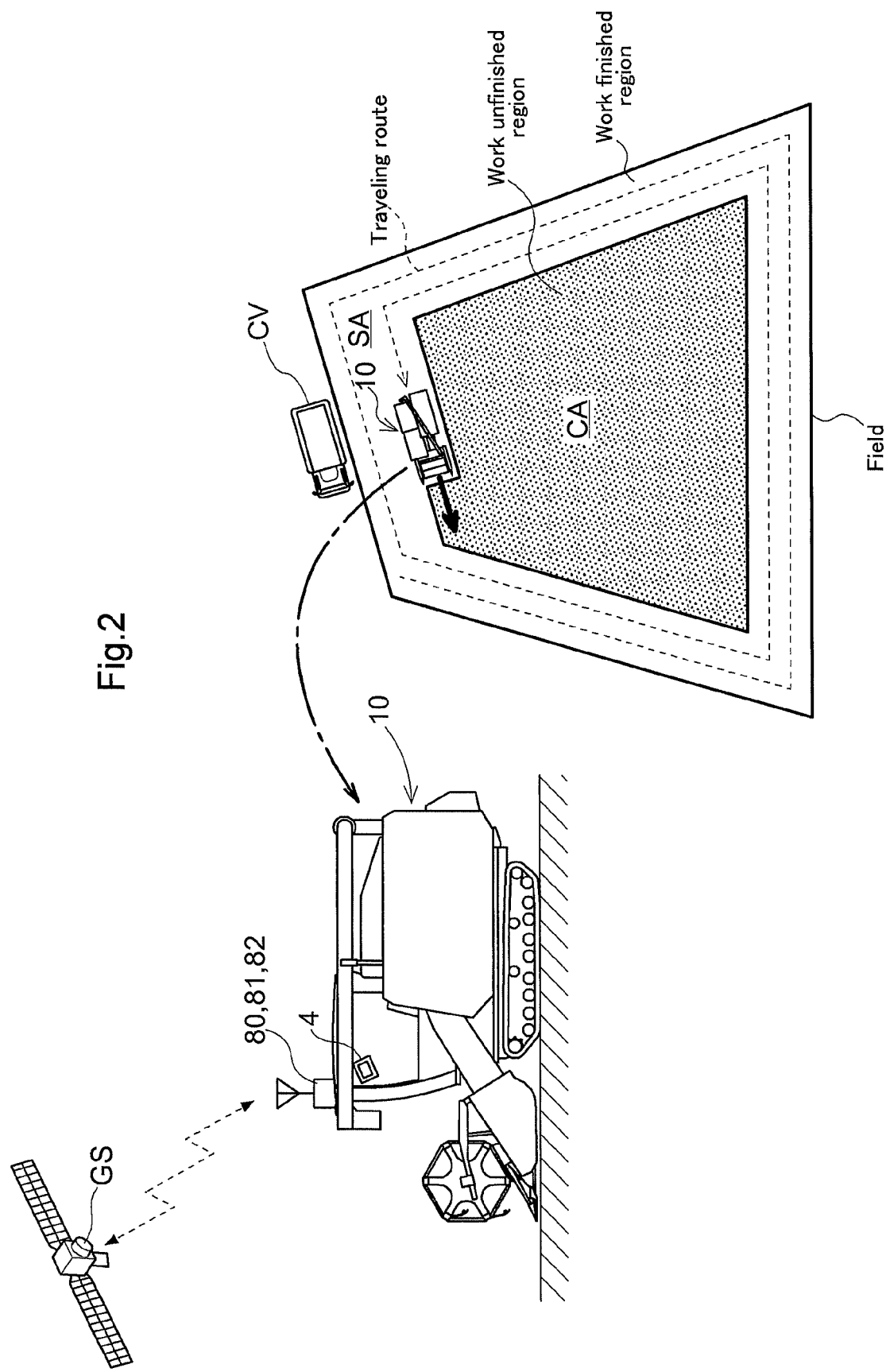
FIG. 2 is a diagram schematically showing automatic traveling of the regular combine harvester.

Next, a regular combine harvester will be described as one example of a harvesting machine according to the present invention that enables automatic driving and manual driving. Note that in the present specification, "front" (the direction of arrow F in FIG. 1) means front in a machine body front-back direction (traveling direction) and "back" (the direction of arrow B in FIG. 1) means back in the machine body front-back direction (traveling direction), unless otherwise stated. Also, a left-right direction or a lateral direction means a machine body transverse direction (vehicle body width direction) that is orthogonal to the vehicle body front-back direction. "Up" (the direction of arrow U in FIG. 1) and "down" (the direction of arrow D in FIG. 1) indicate a positional relationship in a vertical direction (perpendicular direction) of the vehicle body or a relationship in terms of height above the ground.

As shown in FIG. 1, the combine harvester includes a vehicle body 10, a crawler-type traveling apparatus 11, a driving portion 12, a threshing apparatus 13, a grain tank 14, a harvesting portion H, a conveyor apparatus 16, a grain discharge apparatus 18, and a self-vehicle position detection module 80.

The traveling apparatus 11 is provided in a lower portion of the vehicle body 10. The combine harvester is configured to be self-propelled by the traveling apparatus 11. The driving portion 12, the threshing apparatus 13, and the grain tank 14 are provided on the upper side of the traveling apparatus 11 and constitute an upper portion of the vehicle body 10. A driver who drives the combine harvester and an observer who monitors work done by the combine harvester can ride in the driving portion 12. Note that the observer may also monitor work done by the combine harvester from the outside of the combine harvester.

The grain discharge apparatus 18 is provided on the upper side of the grain tank 14. The self-vehicle position detection module 80 is attached to an upper surface of the driving portion 12.

The harvesting portion H is provided in a front portion of the combine harvester. The conveyor apparatus 16 is provided on the back side of the harvesting portion H. The harvesting portion H includes a cutting mechanism 15 and a reel 17. The cutting mechanism 15 reaps planted grain culms in a field. The reel 17 scoops up planted grain culms to be harvested, while being rotationally driven. With this configuration, the harvesting portion H harvests cereals (one type of crops) in a field. The combine harvester can perform work traveling in which the combine harvester travels using the traveling apparatus 11 while harvesting cereals in a field using the harvesting portion H.

Grain culms reaped by the cutting mechanism 15 are conveyed to the threshing apparatus 13 by the conveyor apparatus 16. The reaped grain culms are threshed in the threshing apparatus 13. Grains obtained through threshing are stored in the grain tank 14. The grains stored in the grain tank 14 are discharged to the outside of the machine via the grain discharge apparatus 18 as necessary.

A communication terminal 4 is provided in the driving portion 12. In the present embodiment, the communication terminal 4 is fixed to the driving portion 12. However, the present invention is not limited to this configuration, and a configuration is also possible in which the communication terminal 4 is attachable to and detachable from the driving portion 12 or the communication terminal 4 is located outside the combine harvester.

As shown in FIG. 2, the combine harvester automatically travels along a traveling route set in a field. A self-vehicle position is important for this. The self-vehicle position detection module 80 includes a satellite navigation module 81 and an inertial navigation module 82. The satellite navigation module 81 receives a GNSS (Global Navigation Satellite System) signal (including a GPS signal) transmitted from artificial satellite GS and outputs positioning data for computing the self-vehicle position. A gyroscope acceleration sensor and a magnetic direction sensor are incorporated into the inertial navigation module 82 and the inertial navigation module 82 outputs a position vector that indicates an instantaneous traveling direction. The inertial navigation module 82 is used to complement computation of the self-vehicle position performed using the satellite navigation module 81. The inertial navigation module 82 may also be arranged at a different position from the satellite navigation module 81.

The following describes a procedure of harvesting work that is performed using the combine harvester in a field.

First, as shown in FIG. 2, a driver who also serves as an observer manually operates the combine harvester to perform harvesting in an outer peripheral portion of the field while traveling around along a border line of the field. A region (work finished region) in which crops are reaped at this time is set as an outer peripheral region SA. A region that remains as an unreaped region (work unfinished region) on the inner side of the outer peripheral region SA is set as a work target region CA.

At this time, the driver drives the combine harvester around the field two to three times to make the outer peripheral region SA have a certain degree of width. In this traveling, every time the combine harvester travels around the field, the width of the outer peripheral region SA is increased by a work width of the combine harvester. When the combine harvester has traveled around the field the first three to four times, the outer peripheral region SA has a width that is about two to three times the work width of the combine harvester.

The outer peripheral region SA is used as a space for changing a travelling direction of the combine harvester when harvest traveling is performed in the work target region CA. The outer peripheral region SA is also used as a space for moving to a location at which grains are discharged or fuel is supplied, for example, after the combine harvester has once ceased harvest traveling.

Note that a carrying vehicle CV shown in FIG. 2 can collect and carry grains discharged from the combine harvester via the grain discharge apparatus 18. In discharge of grains, the combine harvester moves to the vicinity of the carrying vehicle CV and then discharges grains from the grain discharge apparatus 18 to the carrying vehicle CV.

Figure 3:
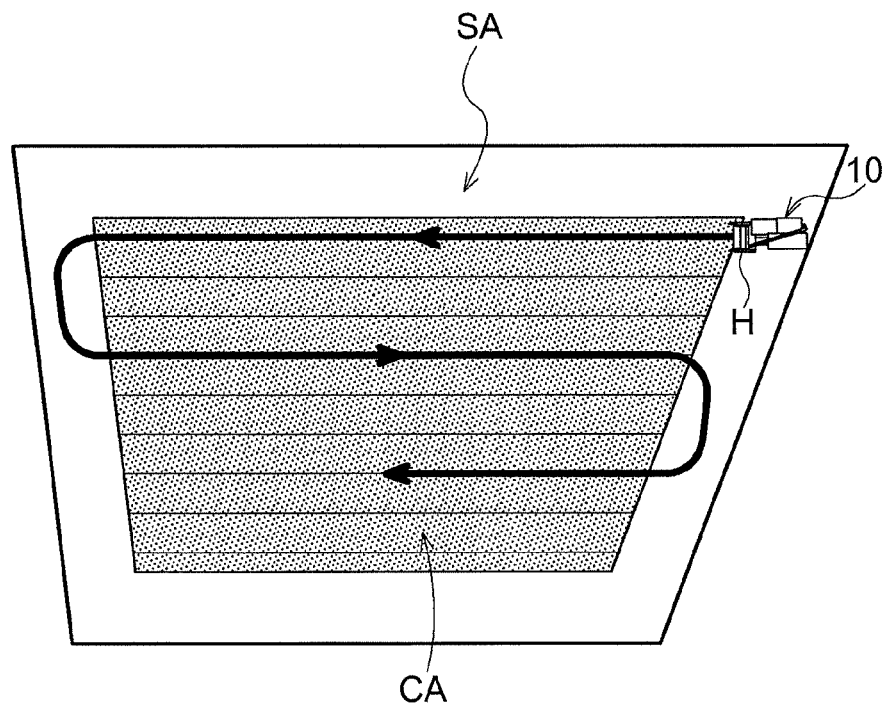
FIG. 3 is a diagram showing a traveling route during automatic traveling.

After the outer peripheral region SA and the work target region CA are set, a traveling route in the work target region CA is computed as shown in FIG. 3. The computed traveling route is sequentially set based on a pattern of work traveling, and automatic travel control is performed so that the combine harvester travels along the set traveling route.

Figure 4:
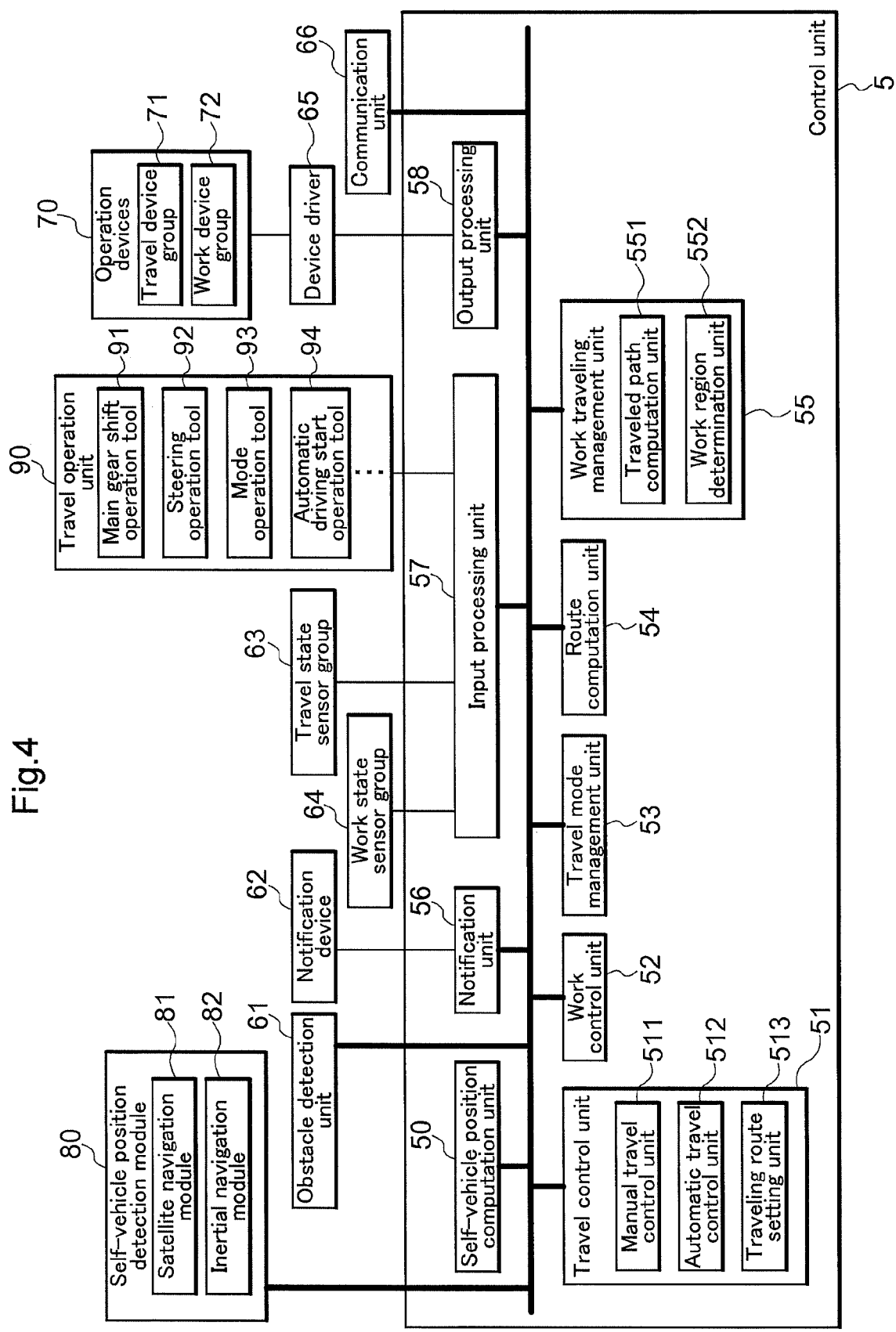
FIG. 4 is a functional block diagram showing a configuration of a control system of the combine harvester.

FIG. 4 shows a control system of the combine harvester in which a traveling route generation system according to the present invention is used. The control system of the combine harvester is constituted by a control unit 5, which is constituted by a large number of electronic control units called ECUs, and various input/output devices that perform signal communication (data communication) with the control unit 5 via a wiring network such as an on-vehicle LAN.

An obstacle detection unit 61 detects obstacles located in a surrounding area of the combine harvester by using a laser radar, an ultrasonic sensor, and a camera. If an obstacle is detected, obstacle detection information that indicates a positional relationship between the detected obstacle and the vehicle body 10 (see FIG. 1, the same applies hereinafter) is output to the control unit 5.

A notification device 62 is a device for notifying the driver or the like of a work traveling state and various kinds of warning, and is a buzzer, a lamp, a speaker, a display, or the like. A communication unit 66 is used by the control system of the combine harvester to exchange data with a management computer that is located at a remote place and the communication terminal 4. The communication terminal 4 includes a tablet computer that is operated by an observer who is standing in the field or an observer (including the driver) who is riding in the combine harvester and a computer that is located in a house or a management office. The control unit 5 is a core element of the control system and is shown as a group of ECUs. Signals are input from the self-vehicle position detection module 80 via the on-vehicle LAN to the control unit 5.

The control unit 5 includes an output processing unit 58 and an input processing unit 57 as input/output interfaces. The output processing unit 58 is connected to various operation devices 70 via a device driver 65. The operation devices 70 include a travel device group 71 that is constituted by devices relating to traveling and a work device group 72 that is constituted by devices relating to work. The travel device group 71 includes an engine control device, a gear shift control device, a brake control device, a steering control device, and the like. The work device group 72 includes power control devices and the like of the harvesting portion H, the threshing apparatus 13, the conveyor apparatus 16, and the grain discharge apparatus 18 described using FIG. 1.

A travel state sensor group 63, a work state sensor group 64, a travel operation unit 90, and the like are connected to the input processing unit 57. The travel state sensor group 63 includes a vehicle speed sensor, an engine speed sensor, an overheating detection sensor, a brake pedal position detection sensor, a parking brake detection sensor, a gear shift position detection sensor, a steering position detection sensor, and the like. The work state sensor group 64 includes sensors for detecting a driving state of a harvest work apparatus (the harvesting portion H, the threshing apparatus 13, the conveyor apparatus 16, and the grain discharge apparatus 18 described using FIG. 1) and sensors for detecting the state of grain culms and grains, for example, a reaping/threshing sensor and a grain volume sensor.

Operation tools that are manually operated by the driver and for which operation signals are input to the control unit 5 are collectively referred to as the travel operation unit 90. The travel operation unit 90 includes a main gear shift operation tool 91, a steering operation tool 92, a mode operation tool 93, an automatic driving start operation tool 94, and the like. The mode operation tool 93 has a function for sending an instruction to switch between automatic driving and manual driving to the control unit 5. The automatic driving start operation tool 94 has a function for sending a final automatic travel start instruction for starting automatic traveling to the control unit 5. In this embodiment, the automatic driving start operation tool 94 includes two buttons, and the automatic travel start instruction is not sent unless a first button (first operation tool) and a second button (second operation tool) are simultaneously operated.

The control unit 5 includes a self-vehicle position computation unit 50, a travel control unit 51, a work control unit 52, a travel mode management unit 53, a route computation unit 54, and a work traveling management unit 55. The self-vehicle position computation unit 50 computes a self-vehicle position in the form of map coordinates (or field coordinates) based on positioning data successively transmitted from the self-vehicle position detection module 80. At this time, a specific position (e.g., the center of the vehicle body or the center of the harvesting portion H) of the vehicle body 10 can be set as the self-vehicle position. A notification unit 56 creates notification data based on an instruction from a functional unit of the control unit 5, for example, and gives the notification data to the notification device 62.

The travel control unit 51 has an engine control function, a steering control function, a vehicle speed control function, and the like and gives a travel control signal to the travel device group 71. The work control unit 52 gives a work control signal to the work device group 72 to control movement of the harvest work apparatus (the harvesting portion H, the threshing apparatus 13, the conveyor apparatus 16, the grain discharge apparatus 18, etc., described using FIG. 1).

The combine harvester can travel in both automatic driving in which harvesting work is performed in automatic traveling and manual driving in which harvesting work is performed in manual traveling. Accordingly, the travel control unit 51 includes a manual travel control unit 511, an automatic travel control unit 512, and a traveling route setting unit 513. Note that an automatic travel mode is set to perform automatic driving and a manual travel mode is set to perform manual driving. These travel modes are managed by the travel mode management unit 53.

If the automatic travel mode is set, the automatic travel control unit 512 creates control signals regarding automatic steering and vehicle speed change including stopping, and controls the travel device group 71. The control signal regarding automatic steering is created to eliminate directional and positional differences between a target traveling route set by the traveling route setting unit 513 and a self-vehicle position computed by the self-vehicle position computation unit 50. The control signal regarding vehicle speed change is created based on a vehicle speed value that is set in advance. The traveling route set by the traveling route setting unit 513 is computed using a route computation algorithm that is registered in the route computation unit 54.

If the manual travel mode is selected, manual driving is realized as a result of the manual travel control unit 511 creating a control signal based on an operation made by the driver and controlling the travel device group 71. Note that the traveling route computed by the route computation unit 54 can also be used for guidance in manual driving to make the combine harvester travel along the traveling route.

Figure 5:
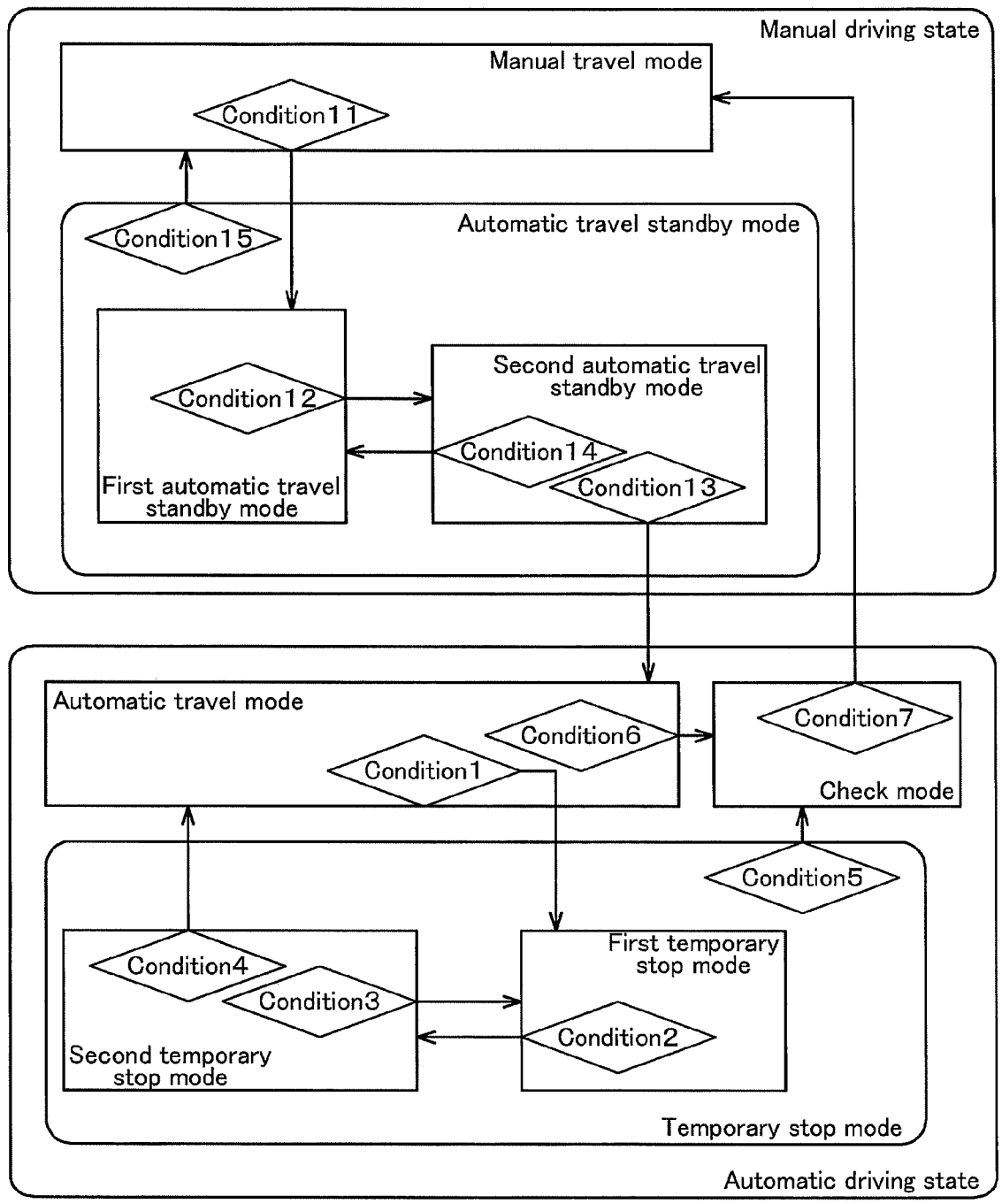
FIG. 5 is a schematic diagram showing mode transition when switching between automatic driving and manual driving.

As schematically shown in FIG. 5, transition is not directly performed between the automatic travel mode in which automatic driving is performed and the manual travel mode in which manual driving is performed, and transition modes are provided between these modes.

An automatic travel standby mode is provided as a transition mode for transitioning from the manual travel mode to the automatic travel mode. The automatic travel standby mode includes a first automatic travel standby mode and a second automatic travel standby mode for which transition between each other is allowed. Transition from the manual travel mode to the automatic travel standby mode is transition to the first automatic travel standby mode. Transition from the automatic travel standby mode to the automatic travel mode is transition from the second automatic travel standby mode.

A temporary stop mode for temporarily stopping the vehicle body 10 during automatic driving and a check mode that is a final gateway in transition from the temporary stop mode to the manual travel mode are provided as transition modes for transitioning from the automatic travel mode to the manual travel mode. The temporary stop mode includes a first temporary stop mode and a second temporary stop mode for which transition between each other is allowed. Transition from the automatic travel mode to the temporary stop mode is transition to the first temporary stop mode, and transition from the temporary stop mode to the automatic travel mode is transition from the second temporary stop mode.

Transition conditions are set for transition between the automatic travel mode, the manual travel mode, and the transition modes provided therebetween. The travel mode management unit 53 (see FIG. 4, the same applies hereinafter) determines whether or not the transition conditions are satisfied, and manages transition to each mode. The following describes transition conditions managed by the travel mode management unit 53, using FIGS. 6 and 7.

First, transition of a travel mode in switching from manual driving to automatic driving and automatic driving transition conditions that need to be satisfied in this transition will be described using FIG. 6 with reference to FIGS. 4 and 5.

Condition 11

A condition (condition 11) for transitioning from the manual travel mode to the first automatic travel standby mode is that a mode switch request for switching to the automatic travel mode is output as a result of the mode operation tool 93 being switched ON by the driver. If the condition 11 (the mode operation tool 93 being switched ON) is satisfied in the manual travel mode, the travel mode transitions to the first automatic travel standby mode.

Condition 12

A condition (condition 12) for transitioning from the first automatic travel standby mode to the second automatic travel standby mode is that the following (12-1) to (12-8) are satisfied.

(12-1): The traveling route is grasped (the automatic travel control unit 512 can determine a target traveling route in the vicinity of the self-vehicle position and compute a positional difference between the target traveling route and the self-vehicle position), (12-2): the main gear shift operation tool 91 is neutral (i.e., adjusted to a neutral position in a vehicle speed adjustment range at which the vehicle speed is zero), (12-3): the steering operation tool 92 is neutral (i.e., adjusted to a neutral position at which the steering angle is zero), (12-4): a reaping/threshing SW (reaping/threshing switch (not shown)) is switched OFF (driving of the harvesting portion H and the threshing apparatus 13 described using FIG. 1 is stopped), (12-5): the self-vehicle position is determined through normal operation of the self-vehicle position detection module 80 (appropriate positioning data is output from the satellite navigation module 81 and appropriate position vector data is output from the inertial navigation module 82), (12-6): the grain tank 14 has room, (12-7): a sufficient amount of fuel remains, and (12-8): an unreaped region remains (an unreaped region remains as the work target region CA).

That is, the condition 12 is a group of automatic driving preliminary conditions, and the travel device group 71 and the work device group 72 are ready for automatic driving when the condition 12 is satisfied. Accordingly, if specifications or the like of the combine harvester is changed, condition elements constituting the condition 12 may be changed.

If all of these conditions are satisfied in the first automatic travel standby mode, the travel mode transitions from the first automatic travel standby mode to the second automatic travel standby mode.

Condition 13

A condition (condition 13) for transitioning from the second automatic travel standby mode to the automatic travel mode is that an automatic driving start request is output as a result of the automatic driving start operation tool 94 being switched ON. If the condition 13 (the automatic driving start operation tool 94 being switched ON) is satisfied in the second automatic travel standby mode, the travel mode transitions to the automatic travel mode and automatic traveling is started.

Condition 14

A condition (condition 14) for returning from the second automatic travel standby mode to the first automatic travel standby mode is that at least one of the above-described condition elements constituting the condition 12, which are automatic driving preliminary conditions, is not satisfied. That is, if any of the automatic driving preliminary conditions are not satisfied in the second automatic travel standby mode, the travel mode returns to the first automatic travel standby mode.

Condition 15

If the driver has once intended automatic driving and caused transition from the manual travel mode to the first automatic travel standby mode, but thereafter wants to return to manual driving, transition from the first automatic travel standby mode to the manual travel mode needs to be performed. A condition (condition 15) for this transition is that a mode switch request for switching to the manual travel mode is output as a result of the mode operation tool 93 being switched OFF by the driver. The condition 15 (the mode operation tool 93 being switched OFF) is satisfied when the mode operation tool 93 is switched OFF and an automatic driving stop request is issued in the first automatic travel standby mode. As a result, the travel mode transitions to the manual travel mode.

Next, transition of the travel mode in switching from automatic driving to manual driving and automatic driving transition conditions that need to be satisfied in this transition will be described using FIG. 7 with reference to FIGS. 4 and 5.

Condition 1

A condition (condition 1) for transitioning from the automatic travel mode to the first temporary stop mode is that the main gear shift operation tool 91 is neutral (i.e., adjusted to the neutral position in the vehicle speed adjustment range at which the vehicle speed is zero) and the steering operation tool 92 is neutral (i.e., adjusted to the neutral position at which the steering angle is zero). If the condition 1 is satisfied in the automatic travel mode, the travel mode transitions to the first temporary stop mode and the vehicle body 10 is temporarily stopped. The condition 1 is usually satisfied as a result of an operation being made by the observer when the observer wants to temporarily stop the vehicle body 10 during automatic driving.

Condition 2

A condition (condition 2) for transitioning from the first temporary stop mode to the second temporary stop mode is that the main gear shift operation tool 91 is displaced from the neutral position and the steering operation tool 92 is displaced from the neutral position.

Here, even if the main gear shift operation tool 91 is displaced from the neutral position, the vehicle body 10 is in a stopped state because the brake is operating. If the condition 2 is satisfied in the first temporary stop mode, the travel mode transitions to the second temporary stop mode.

Condition 3

A condition (condition 3) for transitioning from the second temporary stop mode to the first temporary stop mode is that the main gear shift operation tool 91 is returned to the neutral position and the steering operation tool 92 is returned to the neutral position. If the condition 3 is satisfied in the second temporary stop mode, the travel mode transitions to the first temporary stop mode. That is, the travel mode changes to the first temporary stop mode or the second temporary stop mode according to operation positions of the main gear shift operation tool 91 and the steering operation tool 92. However, the vehicle body 10 is in a stopped state in either case because both modes are temporary stop modes.

Condition 4

When the travel mode returns from the temporary stop mode to the automatic travel mode, the travel mode returns from the second temporary stop mode. A condition (condition 4) for transitioning from the second temporary stop mode to the automatic travel mode is that an automatic driving start request is output as a result of the automatic driving start operation tool 94 being switched ON. If the condition 4 (the automatic driving start operation tool 94 being switched ON) is satisfied in the manual travel mode, the travel mode transitions to the automatic travel mode and automatic traveling is started again.

Condition 5

If specific conditions are satisfied in the temporary stop mode, the travel mode transitions to the check mode, which is a state immediately before manual driving. A condition (condition 5) for transitioning from the temporary stop mode to the check mode is that at least one of the following condition elements (5-1) to (5-10) is satisfied. Note that the condition element (5-1) being satisfied means that normal automatic driving is to be switched to manual driving with an intention of the observer. On the other hand, the condition elements (5-2) to (5-10) indicate the occurrence of phenomena that results in automatic driving no longer being possible, and upon the occurrence of these phenomena, automatic driving is usually switched to manual driving via the check mode.

(5-1): The mode operation tool 93 is switched OFF (a mode switch request for switching to the manual travel mode is output), (5-2): the vehicle body 10 is out of the field (one of the unallowable displacements), (5-3): deviation of the self-vehicle position from the target traveling route is out of an allowable range (one of the unallowable displacements), (5-4): the vehicle speed is abnormal, (5-5): the engine is overheated, (5-6): the grain tank 14 is detected as being full (the grain tank is full), (5-7): clogging of the conveyor apparatus 16 is detected (conveyance clogging), (5-8): an abnormality is occurring in the work device group 72, (5-9): a communication failure is occurring in the on-vehicle LAN, and (5-10): a self-vehicle position detection failure is occurring due to an abnormality in the self-vehicle position detection module 80 (appropriate positioning data is not output from the satellite navigation module 81 or appropriate position vector data is not output from the inertial navigation module 82).

Condition 6

The travel mode can also directly transition from the automatic travel mode to the check mode, and a condition (condition 6) for this transition is the same as the above-described condition 5. One example of cases in which automatic driving is switched to manual driving with an intention of the observer is a case in which automatic driving is switched to manual driving when the combine harvester moves to a location where the carrying vehicle CV is stopped to discharge grains stored in the grain tank 14.

Condition 7

A condition (condition 7) for transitioning from the check mode to the manual travel mode is that the following (7-1) to (7-3) are satisfied.

(7-1): The mode operation tool 93 is switched ON (a mode switch request for switching to the automatic travel mode is output), (7-2): the main gear shift operation tool 91 is neutral (i.e., adjusted to the neutral position in the vehicle speed adjustment range at which the vehicle speed is zero), and (7-3): the reaping/threshing SW (reaping/threshing switch (not shown)) is switched OFF (driving of the harvesting portion H and the threshing apparatus 13 described using FIG. 1 is stopped).

That is, even if the travel mode transitions to the automatic travel mode as a result of the condition 7 being satisfied, work traveling is not suddenly started.

If transition from the automatic travel mode to the manual travel mode or transition from the manual travel mode to the automatic travel mode is requested by the observer via an operation tool such as the mode operation tool 93 or the automatic driving start operation tool 94 as described above, but the transition is not performed because a condition is not satisfied, the notification unit 56 and the notification device 62 give a notification for this.

As shown in FIG. 4, the work traveling management unit 55 includes a traveled path computation unit 551 and a work region determination unit 552. The traveled path computation unit 551 computes a traveled path based on the self-vehicle position computed by the self-vehicle position computation unit 50. The work region determination unit 552 determines the shape of the field, a reaped region (the outer peripheral region SA), an unreaped region (the work target region CA), and the like based on harvesting work that has been done with a predetermined work width along the traveled path.

The work traveling management unit 55 manages items listed below.

(1) As shown in FIG. 2, the outer peripheral region SA and the work target region CA are set as a result of the combine harvester performs manual traveling around the field several times. An external shape of the field (field shape) is computed based on the outermost line of the outer peripheral region SA, and the shape of the work target region CA in which automatic traveling is to be performed is computed based on the innermost line of the outer peripheral region SA. Then, a traveling route for performing automatic traveling is computed with the outer peripheral region SA set as a region for changing a travelling direction, and the work target region CA set as a work traveling region. Accordingly, the route is computed upon an instruction indicating that manual traveling in the outer peripheral region SA is complete being given from the driver to the control unit 5.

(2) In the first manual traveling, an instruction to start acquisition of a traveled path for computing a traveling route and an instruction to end acquisition are given through operations made to a button or the like by the driver. The outer peripheral region SA and the work target region CA are determined based on the traveled path acquired between the instruction to start acquisition and the instruction to end acquisition. With this configuration, the work traveling management unit 55 recognizes that traveling performed by the combine harvester is traveling for computing the traveling route. Note that the combine harvester may also be caused to travel merely for acquiring a traveled path necessary for computing the traveling route. Furthermore, the external shape of the field can be determined and the traveling route can be computed from a traveled path that is acquired in non-work traveling in which work is not done, if an instruction to start acquisition of the traveled path and an instruction to end acquisition are given. Also, the work traveling management unit 55 may be provided with a function for computing a traveled path at an appropriate timing even if the driver forgets to give an instruction to end acquisition, and computing a work route when the work target region CA is determined. Furthermore, a configuration may also be employed in which one or both of a traveled path and a traveling route are automatically computed based on signals received from the travel state sensor group 63 and the work state sensor group 64 even if an instruction to start acquisition and an instruction to end acquisition are not given. If there is a missing portion in the traveled path necessary for computing the outer peripheral region SA, the work target region CA, and the traveling route, a notification of an error may be given to urge the driver to perform additional traveling. Similarly, it is also possible to provide a function for giving guidance for acquiring a traveled path for computing a traveling route until the outer peripheral region SA necessary for turning the combine harvester is obtained.

(3) In order to compute a traveling route for automatic traveling, the outer peripheral region SA needs to be large enough to change a travelling direction. Accordingly, the control unit 5 may also include a guidance function for checking whether or not an outer peripheral region SA that enables computing of the traveling route is obtained, and giving a notification of a check result. A place that does not have an area large enough to change a travelling direction is detected, and a notification for urging harvesting work in this place is issued.

(4) In principle, the outer peripheral region SA is formed through manual traveling because steering for making a turn at a corner portion is difficult. However, in some cases, the outer peripheral region SA includes a long straight route, and automatic traveling is convenient for such a route. Accordingly, a configuration is also possible in which the outer peripheral region SA is formed by performing manual traveling and automatic traveling in combination, and the field shape and the shape of the work target region CA are computed from traveled paths of the manual traveling and the automatic traveling.

(5) If work traveling is performed in a rectangular work target region CA by repeating automatic traveling along straight traveling routes, when traveling from one end to the other end of one traveling route is complete, a harvest finished flag is given to the traveling route and a traveled path having a work width is added as a work finished region. However, if automatic traveling is switched to manual traveling at an intermediate position of a straight traveling route along which automatic traveling is performed, a traveled path of the automatic traveling is interrupted, causing a problem in that the harvest finished flag is not given. Therefore, a function is also provided for giving the harvest finished flag when the combine harvester reaches a terminal end of the traveling route, assuming that normal work traveling has been continued even if automatic traveling has been switched to manual traveling at an intermediate position of the traveling route, and adding a traveled path extending along the traveling route and having a work width as a work finished region.

The following lists configurations that are convenient for a harvesting machine that performs automatic driving.

(a) The observer (driver) avoids unnecessarily gripping an operation tool or the like during automatic driving because this may result in an operation being performed by mistake. Therefore, the hands of the observer are free, and there is a problem in that the body of the observer is unstable when the combine harvester travels on an uneven surface. Therefore, it is preferable to provide a grip or the like in the vicinity of a seat that the observer can hold while sitting. The observer can stabilize their posture during automatic driving by holding the grip. For the same purpose, an arm rest can also be provided instead of or in addition to the grip.

(b) During automatic driving, changes in movement of the vehicle body 10, i.e., acceleration, deceleration, stopping, starting, turning, and the like of the vehicle body 10 occur under control performed by the automatic travel control unit 512. At this time, the notification unit 56 and the notification device 62 give a notification (e.g., "the combine harvester will soon make a turn") that indicates a change in movement of the vehicle body 10 so that the manager will not be surprised. The notification device 62 may be provided inside or outside the driving portion 12, or inside and outside the driving portion 12.

(c) During automatic driving, the vehicle speed sometimes needs to be manually adjusted according to the state of crops or the like even if steering is left to the automatic travel control unit 512. In order to smoothly adjust the vehicle speed during automatic driving, the use of the main gear shift operation tool 91 is proposed. The vehicle speed is adjusted according to an operation amount of the main gear shift operation tool 91 during automatic driving. A harvesting machine usually includes a main gear shift operation tool 91 that is configured to pivot forward and backward, and a forward traveling speed is adjusted as a result of the main gear shift operation tool 91 pivoting forward from the neutral position, and a backward traveling speed is adjusted as a result of the main gear shift operation tool 91 pivoting backward from the neutral position. In this case, vehicle speed control that is adapted to human engineering is realized with a configuration in which the vehicle speed becomes higher than a set value through forward pivoting and becomes lower than the set value through backward pivoting. Note that a relationship between a pivot angle and a vehicle speed change amount may be linear or nonlinear. Furthermore, if the communication terminal 4 includes a touch panel, a configuration may also be employed in which a triangular software switch for acceleration and an inverted triangular software switch for deceleration are displayed on the touch panel, and the vehicle speed can be adjusted through an operation made to the touch panel. With regard to the use of a touch panel, a method may also be employed in which a value that indicates a change amount of the vehicle speed is input. An adjustment range of the vehicle speed is preferably about 2.0 m/second.

(d) The observer sits on the seat for a long time in automatic driving, when compared to manual driving. Therefore, it is preferable to provide a heater and a cool air emitting device on the seat to make a seating environment comfortable. In particular, a duct structure for sending heated air from the engine to the underside of the seat is effective to keep off the cold in winter.

Other Embodiments

The following describes other embodiments. The reference signs used in FIGS. 1 to 4 and the above description will be used in the following description.

(1) Not only hardware but also software may perform control operations, for example, mode change control, performed by the control unit 5. A configuration is also possible in which the control operations are performed through execution of a program that prescribes the control operations. In this case, the program is stored in a storage apparatus (not shown) and executed by a CPU or an ECU (not shown.)

(2) If it is a precondition that an observer riding in the driving portion 12 monitors the state of automatic driving during automatic driving, a situation needs to be avoided in which automatic driving is performed with no one riding in the driving portion 12. Therefore, it is preferable to provide a door switch that detects opening of a door after a main switch inside the driving portion 12 is operated, and stop automatic traveling and/or the vehicle body 10 upon opening of the door being detected by the door switch. A configuration is also possible in which a seating switch is provided on an observer seat (driver seat), and the absence of the observer is detected using the seating switch, instead of the door switch. Furthermore, a configuration may also be employed in which a seat belt and a seat belt switch that detects the use of the seat belt are provided on the observer seat, and automatic traveling and the vehicle body 10 are stopped if the absence of the observer is detected based on a signal received from the seat belt switch. It goes without saying that all or some of the above-described configurations for detecting the absence of the observer may be employed at the same time.

(3) Condition elements that constitute the transition conditions in the above-described embodiment may further include ON/OFF of a parking brake, system abnormality, an engine state, a threshing amount, and the like. Alternatively, some of the above-described condition elements may be omitted.

(4) The functional units shown in FIG. 4 are classified mainly for the purpose of description. In practice, each functional unit may be integrated with another functional unit, or may be divided into a plurality of functional units. Furthermore, a configuration may also be employed in which the travel mode management unit 53, the route computation unit 54, and the work traveling management unit 55 of the functional units provided in the control unit 5 are provided in a portable communication terminal 4 (e.g., a tablet computer), which is brought into the harvesting machine, and data is exchanged between these units and the control unit 5 wirelessly or via the on-vehicle LAN.

(5) In the above-described embodiment, the observer manually drives the combine harvester to perform harvesting in an outer peripheral portion of the field while traveling around along a border line of the field as shown in FIG. 2, and thereafter a traveling route is computed and manual driving is switched to automatic driving. However, the present invention is not limited to this configuration, and a configuration is also possible in which the combine harvester is automatically driven from the beginning and is switched to manual driving upon the occurrence of a special situation. Alternatively, a configuration is also possible in which the combine harvester is automatically driven on a straight or substantially straight traveling route and is manually driven on a traveling route that requires a sharp turn such as a turn for changing a traveling direction.

Note that configurations disclosed in the above-described embodiments (including the other embodiments, the same applies hereinafter) can also be applied in combination with configurations disclosed in other embodiments, and the embodiments disclosed in the present specification are examples, do not limit embodiments of the present invention, and can be modified as appropriate within a scope not departing from objects of the present invention.

INDUSTRIAL APPLICABILITY

The present invention can be applied to not only a regular combine harvester but also a head-feeding combine harvester. Also, the present invention can be applied to various harvesting machines such as harvesting machines of corn, potato, carrot, sugarcane, and the like.

DESCRIPTION OF REFERENCE SIGNS

4: communication terminal
10: vehicle body
5: control unit
50: self-vehicle position computation unit
51: travel control unit
511: manual travel control unit
512: automatic travel control unit
513: traveling route setting unit
52: work control unit
53: travel mode management unit
54: route computation unit
55: work traveling management unit
551: traveled path computation unit
552: work region determination unit
80: self-vehicle position detection module
81: satellite navigation module
82: inertial navigation module
90: travel operation unit
91: main gear shift operation tool
92: steering operation tool
93: mode operation tool
94: automatic driving start operation tool
H: harvesting portion
SA: outer peripheral region

The invention claimed is:

1. A harvesting machine that includes a harvest work apparatus and enables automatic driving and manual driving, comprising:
a travel operation unit that is configured to be manually operated and includes a mode operation tool for switching between the automatic driving and the manual driving:
a manual travel control unit that includes a manual travel mode in which the manual driving is performed based on an operation signal received from the travel operation unit; and
an automatic travel control unit that includes an automatic travel mode in which the automatic driving is performed based on a self-vehicle position and a target traveling route, a temporary stop mode in which a vehicle body is temporarily stopped during the automatic driving for transitioning from the automatic travel mode to the manual travel mode, and a check mode in which whether a state of the travel operation unit satisfies a manual driving transition condition required for starting the manual driving is checked in transition from the temporary stop mode to the manual travel mode,
wherein the temporary stop mode includes a first temporary stop mode and a second temporary stop mode for which transition between each other is allowed, and transition from the automatic travel mode to the temporary stop mode is transition to the first temporary stop mode, and transition from the temporary stop mode to the automatic travel mode is transition from the second temporary stop mode;
wherein the travel operation unit includes a main gear shift operation tool and a steering operation tool,
a condition for transitioning from the first temporary stop mode to the second temporary stop mode is that the main gear shift operation tool is displaced from a neutral position and the steering operation tool is displaced from a neutral position, and a condition for transitioning from the second temporary stop mode to the first temporary stop mode is that the main gear shift operation tool is set to the neutral position and the steering operation tool is set to the neutral position.

2. The harvesting machine according to claim 1,
wherein the travel operation unit includes a main gear shift operation tool and a steering operation tool, and
the manual driving transition condition is that an automatic driving stop request is output from the mode operation tool, the main gear shift operation tool is set to a neutral position, the steering operation tool is set to a neutral position, and driving of the harvest work apparatus is stopped.

3. The harvesting machine according to claim 1,
wherein the travel operation unit includes a main gear shift operation tool and a steering operation tool, and
a condition for transitioning from the automatic travel mode to the temporary stop mode is that the main gear shift operation tool is set to a neutral position and the steering operation tool is set to a neutral position.

4. The harvesting machine according to claim 1,
wherein a condition for transitioning from the temporary stop mode to the check mode includes at least one of output of an automatic driving stop request from the mode operation tool, an abnormal vehicle speed, inappropriate positioning, deviation of the self-vehicle position, and a trouble in the harvest work apparatus.

* * * * *